United States Patent [19]
Nuss

[11] Patent Number: 5,113,574
[45] Date of Patent: May 19, 1992

[54] PROCESS AND DEVICE FOR THE CONNECTION OF ARMATURE COIL WIRES WITH THE LAMELLAS OF A HOOK-COLLECTING DEVICE

[75] Inventor: Lothar Nuss, Offenbach, Fed. Rep. of Germany

[73] Assignee: Stapla Ultraschall-Technik GmbH, Fed. Rep. of Germany

[21] Appl. No.: 477,930
[22] PCT Filed: Oct. 19, 1989
[86] PCT No.: PCT/DE89/00668
§ 371 Date: Jun. 19, 1990
§ 102(e) Date: Jun. 19, 1990
[87] PCT Pub. No.: WO90/04864
PCT Pub. Date: May 3, 1990

[30] Foreign Application Priority Data
Oct. 21, 1988 [DE] Fed. Rep. of Germany ....... 3835818

[51] Int. Cl.⁵ ............................................ H01R 43/04
[52] U.S. Cl. ...................................... 29/597; 21/598; 310/42; 310/71; 310/234
[58] Field of Search .................. 29/597, 598; 310/233, 310/234, 42, 71

[56] References Cited
U.S. PATENT DOCUMENTS
3,781,981 1/1974 Miura et al. ........................ 29/597
4,835,430 5/1989 Sin ..................................... 29/597 X FOREIGN PATENT DOCUMENTS
2416411 10/1974 Fed. Rep. of Germany.
2511102 9/1975 Fed. Rep. of Germany.
2739730 3/1978 Fed. Rep. of Germany.
3017426 11/1981 Fed. Rep. of Germany.
3437744 4/1986 Fed. Rep. of Germany.
2591042 6/1987 France.

Primary Examiner—Carl E. Hall
Attorney, Agent, or Firm—Allegretti & Witcoff, Ltd.

[57] ABSTRACT

A process for the production of an electrically conducting and mechanically solid connection between armature coil wires and hooks on the lamellas of a commutator comprising 1) laying the insulated wires around the hooks of the lamellas without stripping the insulation; 2) before bending back the hooks, at least partially destroying by thermal and/or mechanical abrading means, the varnish insulating on the wires; 3) removing the residues or remnants of the varnish insulation layer during the bending back of the hooks, by ultrasonic oscillations; 4) squeezing the removed varnish into a wedge-shaped space formed between the winding wire, the internal surface of the hook and the surface of the commutator; and 5) ultrasonically welding the hook ends to the lamellas. Variously constructed devices for the execution of the process are also proposed.

10 Claims, 6 Drawing Sheets

PROCESS AND DEVICE FOR THE CONNECTION OF ARMATURE COIL WIRES WITH THE LAMELLAS OF A HOOK-COLLECTING DEVICE

BACKGROUND OF THE INVENTION

The invention relates to a process for the production of an electrically-conducting and mechanically solid connection of armature coil wires with the lamellas of a commutator in which the wires are laid around the hooks of the lamellas of the commutator during the winding process without prior stripping of the insulation and the free ends of the hooks are connected with the corresponding lamellas of the commutator by ultrasonic welding. The invention also includes devices which are specifically suited for the execution of the process, in combination with a sonotrode which is movable relative to the commutator for bending back the hooks and the ultrasonic welding of the ends of the hooks with the lamellas of the commutator.

THE PRIOR ART

It has been previously proposed to connect the wires of an armature coil with the lamellas of a commutator, which connection is both electrically conductive as well as mechanically solid, by means of ultrasonic welding (DE-OS 27 39 730; DE-OS 30 17 426). Because of the careful thermal treatment of the commutator which can thereby be attained, this process is particularly advantageous; but this process does not provide reproducible electrical connections between the armature coil wires and the lamellas of the commutator. It has been shown, rather, that an electrical connection which is consistently good from one lamella to the other is not possible, because the wire insulation or the remnants of the insulation produce unsatisfactory transition resistances and, in the worst cases, completely prevent an electrical connection.

DE-OS 30 17 426 discloses a process in which the lamellas of the commutator are supposed to be rolled and/or reversed on the contact surface of a sonotrode, by means of which, during the welding process, the varnish insulation of the armature coil wires is flaked away and, at the same time, a mechanical connection between the hooks and the lamellas is supposed to be created by means of ultrasonic welding. The desired flaking away of the varnish insulating layer does not, however, take place uniformly and/or completely so that this process does not lead to reproducible electrical connections of the individual lamellas of a commutator. A high rate of rejects results, so the process is not suitable for the mass production of commutators.

Another process has been proposed (DE-OS 24 16 411) in which the insulation is removed from the armature wire loops before they are laid around the hooks. The hooks are subsequently bent back and pressure-welded with the ends of the lamellas. The partial removal of the varnish insulation from the wire loops before their application to the hooks is, however, an expensive operation, one which has to be carried out separately for every wire loop. In order to avoid short circuits between adjacent wire loops stripped of insulation, the ends of the lamellas are in this case, positioned alternately in different planes, which makes the production of such types of commutators more expensive.

SUMMARY OF THE INVENTION

One object of the present invention is to provide a process which produces good electrically-conductive connections between the armature coil wires and all lamellas of a commutator, without the ends of the lamellas having to be positioned in different planes in order to prevent short circuits.

In accordance with the invention, the layer of varnish insulation on the armature wire is at least partially destroyed before bending the hooks by thermal and/or mechanical means. The partial destruction occurs only at the points or curves of the hooks. The residue or remnant of the layer of varnish insulation during the bending back of the hooks is at least partially removed by the ultrasonic oscillations before welding the ends of the hooks to the lamellas of the commutator.

By means of the thermal and/or mechanical destruction of the varnish insulating layer on the wires already placed around the hooks of the lamellas of the commutator, the steps involving a prior stripping of the insulation are avoided, on the one hand, and, on the other hand, the stripping of the insulation is essentially limited in its spatial extent to the areas of the wires engaging the hooks, so that short circuits between adjacent wires are excluded, despite positioning of the wire loops at equal radial distances from the rotary axis of the commutator. The residues or remnants of the varnish insulating layer which accumulate during the thermal and/or mechanical destruction of the varnish insulating layer are, during the process of bending, either displaced or removed under the action of ultrasonics before the hooks are completely bent back and welded at their ends with the lamellas of the commutator. In this manner, uniform metallic contact surfaces are obtained between the lamellas and hooks, on the one hand, and the corresponding wire surfaces, on the other hand.

An advantage of the process is that the residue or remnants of the varnish insulating layer, insofar as they have not been completely removed, are displaced during the bending by means of the ultrasonic oscillations, into a wedge-shaped space between the wire, the internal surface of the hook and the surface of the lamella. Thus, defined zones of metallic contact result between the wires, the internal surface of the hooks and the surface of the lamellas at every hook.

In order to secure the at least partial destruction of the varnish insulating layer, thermal and/or mechanical action are exerted on the varnish insulating layer within the space between the ends of the hooks and of the surfaces of the lamellas. In this way, sufficiently large surface areas of the wires can be reliably stripped of the varnish insulating layer.

Several advantageous variants of the process are available for the at least partial destruction of the varnish insulating layer by means of thermal effects. Thus, the varnish insulating layer can be at least partially removed by contacting of a highly-heated body with the wires. Focused flaming or blowing of highly-heated air onto the wires causes an effective attack on the varnish insulating layer. A burning off of the varnish insulating layer by means of a laser beam is also possible. Finally, all the wires of a commutator at the points of the hooks may simultaneously be heated by direct inductive means through which the varnish insulating layer is simultaneously attacked at all hooks.

Various mechanical means are also available for the at least partial destruction of the varnish insulating layer. Thus, the varnish insulating layer can be removed, either in addition to the described thermal process, or exclusively, by brushing off the wires at the desired point, or by blasting the wires with fine solid particles. The additional use of mechanical processes is carried out subsequent to the thermal processes.

With a plurality of the possible thermal or mechanical variants of the process, it is of advantage if, for the at least partial destruction of the varnish insulating layer, the abrasive effect on the wires is carried out during a relative rotation between the thermally and/or mechanically acting devices and the commutator about the axis of the commutator.

Corresponding to the number of the above-stated process variants, several devices for the execution of the process in accordance with the invention have also been proposed. If the at least partial destruction of the varnish insulating layer is intended to be carried out through the contact of an incandescent body with the insulated wires, then the device is advantageously constructed with a ring which can be heated either inductively or electrically, positioned concentrically around the commutator and radially spaced therefrom. The ring is attached in a displaceable manner to a support unit which moves parallel to the axis of the commutator.

If, on the other hand, the varnish insulating layer is attacked by means of a torch, a stream of highly-heated gas or by means of a laser beam, then the device includes at least one burner or hot air nozzle or a laser head positioned on the circumference of the commutator. The beam direction or directions of these devices form an acute angle with the commutator axis, thus striking the wires laid around the hooks.

For the mechanical destruction of the varnish insulating layer the device includes a ring having steel bristles concentric with the commutator and spaced radially therefrom. The ring is attached to a support unit which can be rotated around the axis of the commutator and can be moved parallel to the axis thereof into contact with the insulated wire.

The construction of the device for the destruction of the varnish insulating layer by bombarding the wires with fine solid particles comprises at least one jet nozzle for the discharging of fine solid particles at a high speed, positioned on the circumference of the commutator and spaced therefrom. The particle stream of the nozzle forms an acute angle with the commutator axis, and strikes the wires placed around the hooks.

The device for simultaneously heating, directly and inductively at the points concerned, comprises an induction coil mounted concentrically with the commutator and radially spaced from the hooks. The induction coil and the commutator are axially displaceable relative to one another. This axial displaceability permits removal of the induction coil from the hook area so that after the direct inductive heating of the wire loops, the hooks are exposed to the action of the sonotrode.

DETAILED DESCRIPTION

Further details and characteristics of the process in accordance with the invention and of the devices proposed for its execution will be illustrated in greater detail in the following embodiments by means of the schematically depicted diagrams. The diagrams depict the following:

Figure 9:
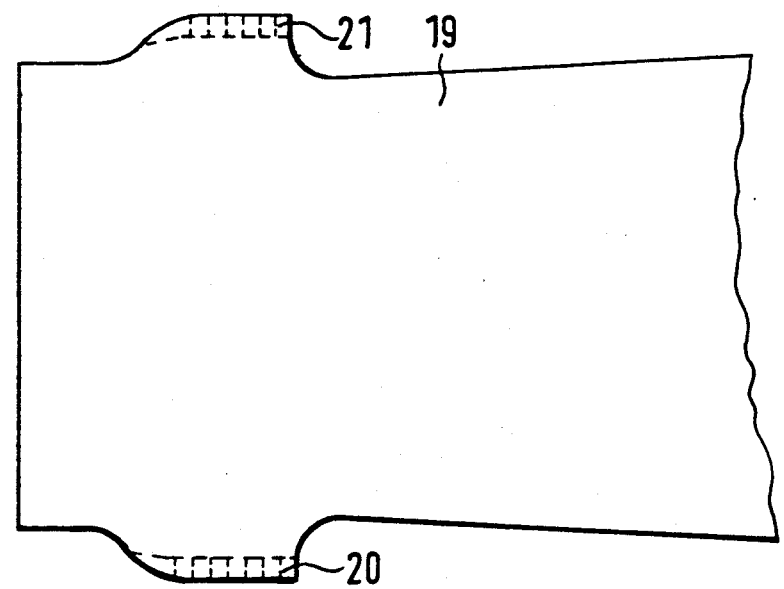
Figure 9:
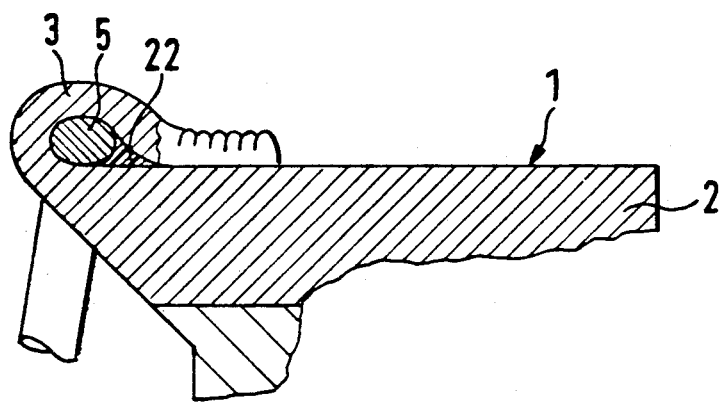
Figure 10:
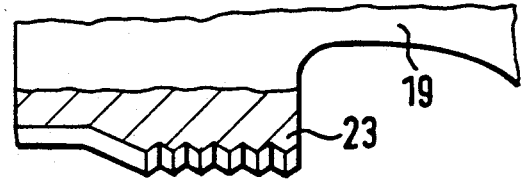
Figure 10:
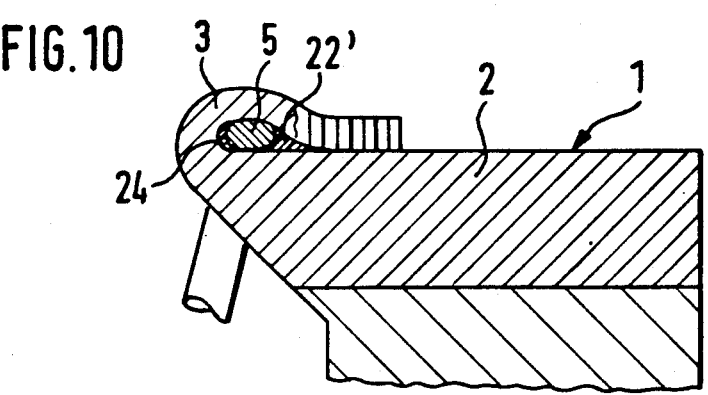

FIGS. 9 and 10 each depict a cut-away longitudinal section through one lamella of the commutator with sonotrodes positioned opposite the commutator, in two different embodiments.

Figure 11:
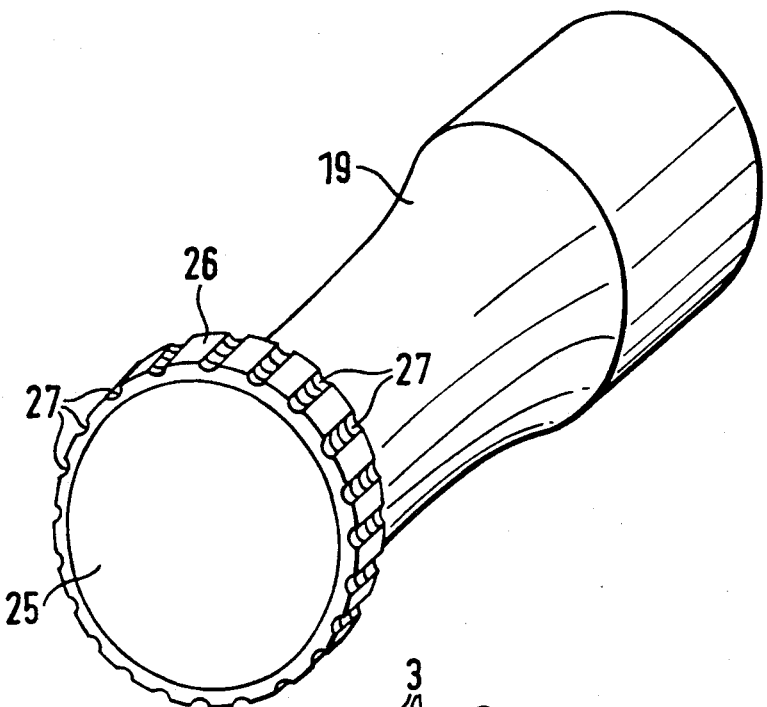
Figure 11:
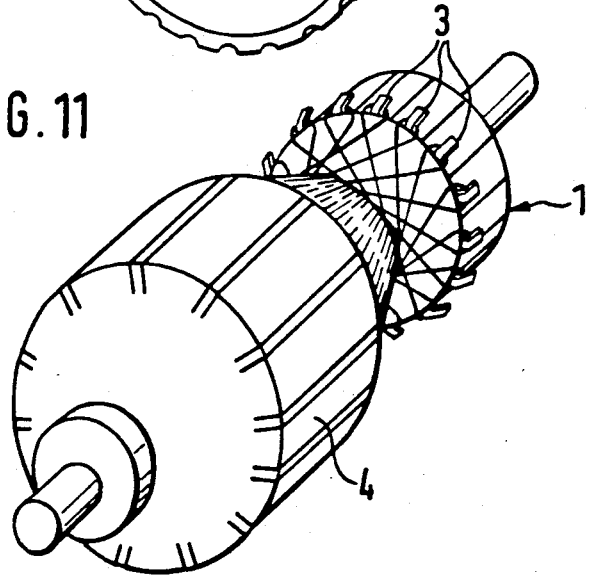

FIG. 11 is a perspective view of an armature with commutator and a rotatable sonotrode positioned opposite the commutator.

Figure 1:
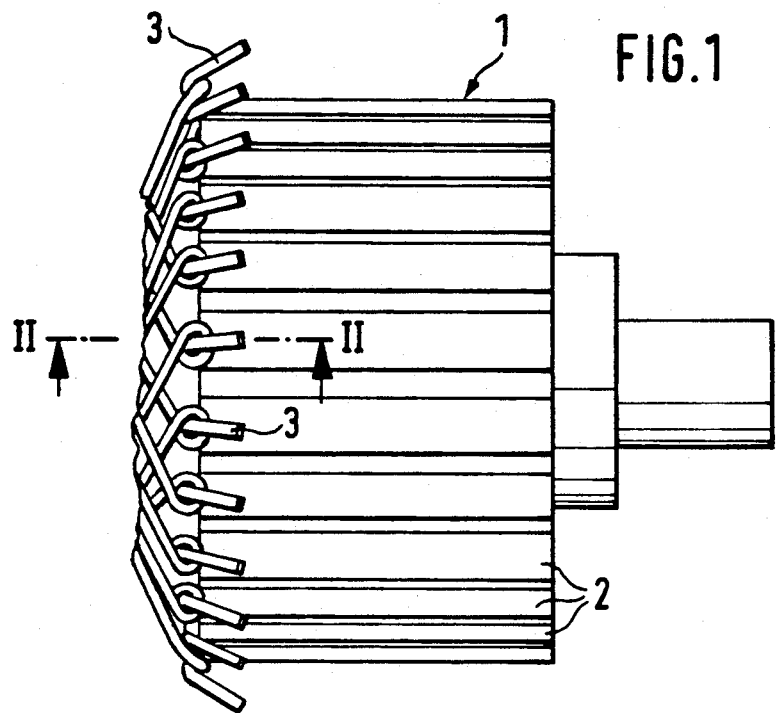
FIG. 1 is a lateral view of a commutator depicted in cut-away form.
Figure 2:
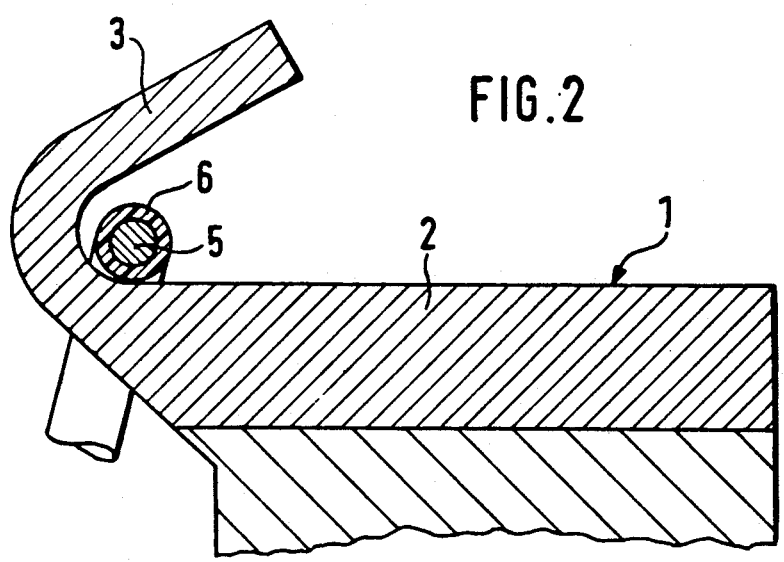
FIG. 2 is a cross section, depicted in cut-away form, through one lamella of the commutator along the line II—II in FIG. 1.

The commutator 1 depicted in FIG. 1 has a multitude of lamellas 2 positioned at equal distances on its cylindrical surface. At one end of each lamella a hook 3 is integrally formed. The hooks 3 are first located in a bent position as depicted in FIGS. 1 to 9. This bent position makes possible, during the winding of the armature 4, which is only depicted in FIG. 11, the twisting of the armature coil wires 5 around the hooks 3.

Before the hooks 3, under the effect of ultrasonics, are bent back in the direction of the surface of the lamellas 2 in a manner which will be described later, the varnish insulating layer 6 located on the armature coil wires 5 at the points of the hooks 3 is, at least partially destroyed, either thermally and/or mechanically. The effect on the varnish insulating layer is exerted roughly in the longitudinal direction of the commutator 1 within the distances located between the ends of the hooks 3 and the surfaces of the lamellas 2. The thermal processes will first be described in further detail by reference to the figures depicting the corresponding devices.

Figure 3:
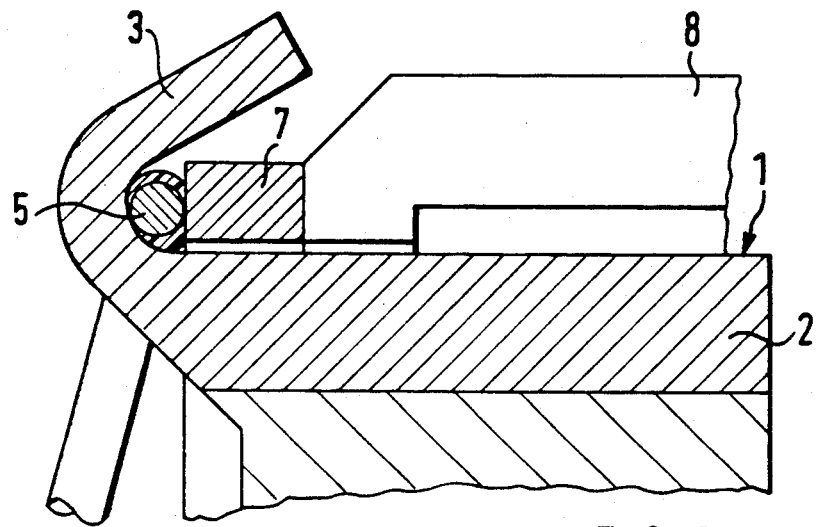
FIG. 3 is a section similar to FIG. 2 through one lamella of the collecting device and a heater ring for contacting the insulated wires.

In the device depicted in FIG. 3, a ring 7 is attached to a support unit 8 mounted for movement parallel to the axis of the commutator 1. The ring is radially spaced from the circumferential surface of the commutator to provide a gap between the ring and the surface of the commutator. The ring 7 can be heated by inductive means, for example, up to the point of red heat. If the ring 7 thus heated is brought into contact with the armature coil wires 5 inserted in the hooks 3, as is indicated in FIG. 3, the varnish insulating layer 6 at the points of engagement, and in immediate proximity thereto, is thermally damaged so that it loosens, in this area, from the wires 5. By this means, the thermal effect is exerted simultaneously for all the hooks 3 and the armature coil wires 5 inserted into the hooks. Simultaneously with the contact of the ring 7 with the wires, the ring can be rotated with respect to the commutator 1 to mechanically scratch away the varnish insulating layer at the points of engagement.

Figure 4:
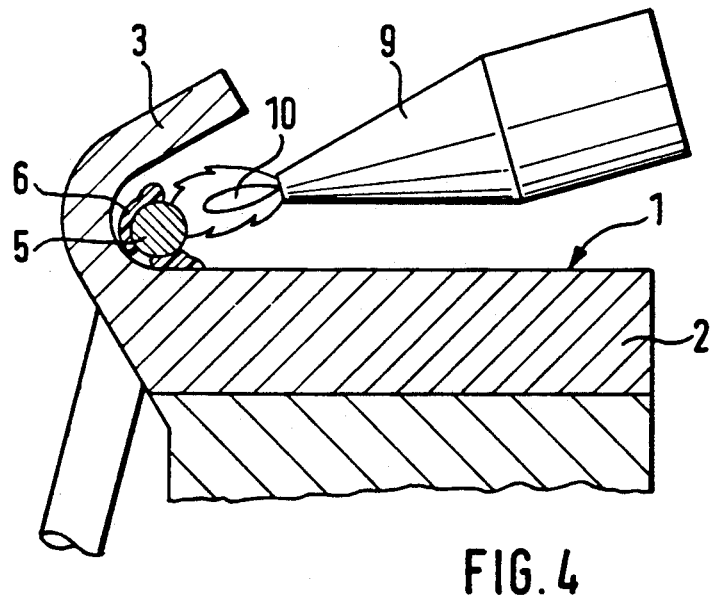
FIG. 4 is a longitudinal section depicted in cut-away form through one lamella of the commutator in combination with a device for the flaming or blowing of highly-heated air.

In the device depicted in FIG. 4, at least one burner or hot air nozzle 9 is positioned in a stationary manner, on the circumference of the collecting device 1 and spaced therefrom. A flame 10 or heated gas removes the varnish insulating layer 6 from the armature coils wires 5. During this operation, the commutator 1 rotates around its axis in order to bring all the wires located in the hooks 3 uniformly into contact with the flame 10 or with the heated air.

Figure 5:
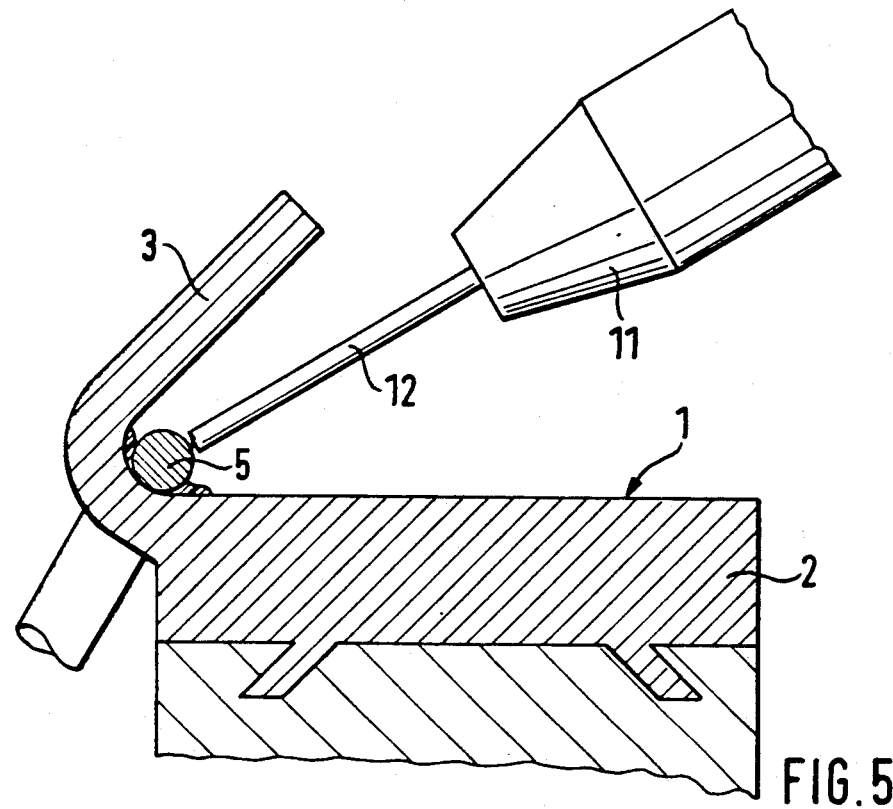
FIG. 5 is a cut-away longitudinal section through one lamella of the commutator in combination with a laser beam device.

A similar device is depicted in FIG. 5 in which the burner or a hot air nozzle is replaced by a laser head 11, from which a laser beam 12 is focused on the armature coil wires 5 set into the hooks 3. In this case also, the laser head 11 is stationary while the commutator 1 is mounted for rotation around its axis.

Figure 6:
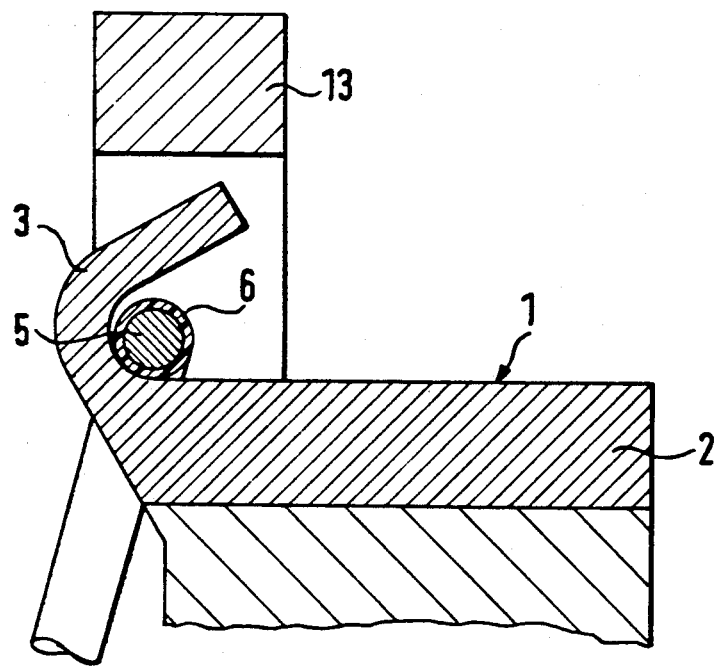
FIG. 6 is a cut-away longitudinal section through one lamella of the commutator in combination with an induction coil.

In the device depicted in FIG. 6, and induction coil 13 is mounted concentrically with the commutator 1 and radially spaced from the hooks 3 on all sides. In this case, rotation between the induction coil 13 and the commutator 1 is not provided. Rather, the induction coil 13 and the commutator 1 must be mounted displaceably to one another in the longitudinal or axial direction, so that, after the induction heating of the armature coil wires 5, the hooks 3 can be exposed to the action of a sonotrode. During the induction heating of the armature coil wires, which primarily takes place in the area of the hooks 3, the varnish insulating layer 6 is thermally so damaged that, during the following working operations good metallic contact is provided between the lamellas, the hooks and the wires.

Figure 7:
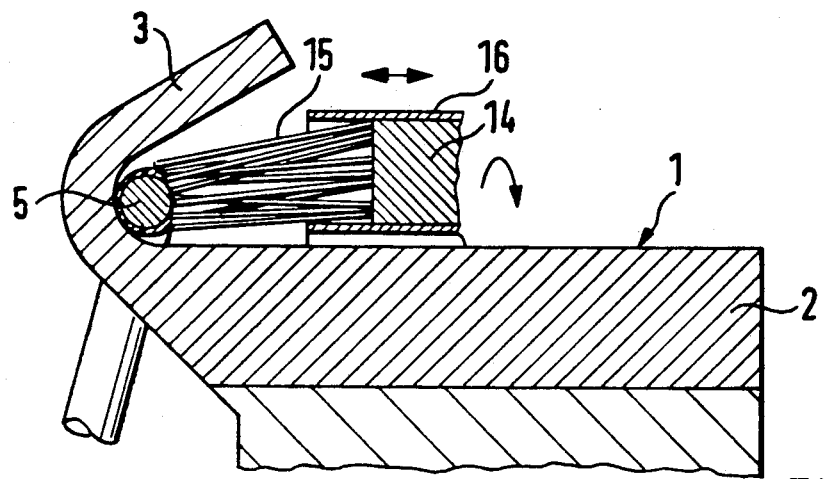
FIG. 7 is a cut-away longitudinal section through one lamella of the commutator in combination with a device for brushing the wires.
Figure 8:
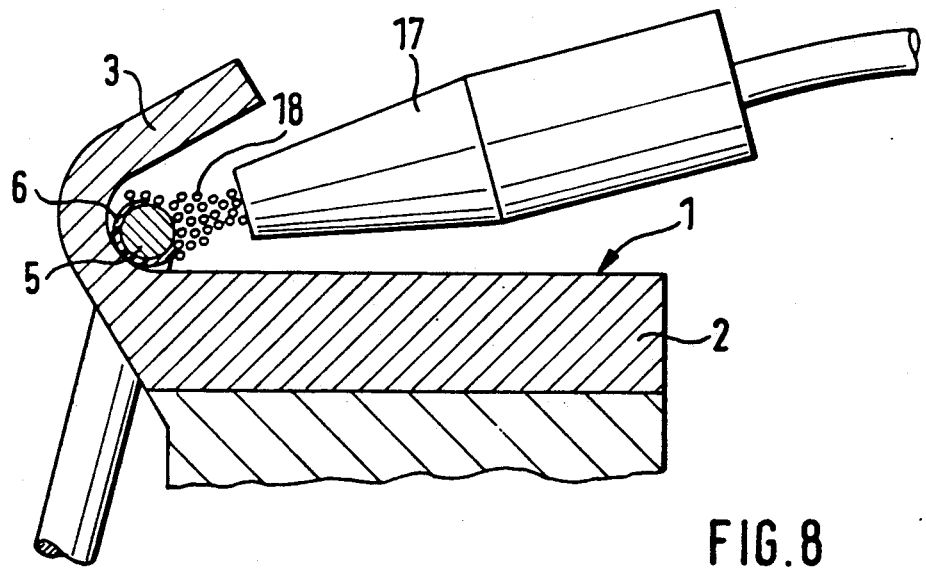
FIG. 8 is a cut-away longitudinal section through one lamella of the commutator in combination with a device for bombarding the wires with fine solid particles.

If the first process step of the at least partial destruction of the armature coil wires 5 set into the hooks 3 is being carried out by mechanical means alone, or by mechanical means in addition to the prior thermal effect, this step can be carried out with devices depicted in FIGS. 7 and 8. According to FIG. 7, a ring 14 having axially disposed steel bristles 15 or the like on its circumference is positioned concentrically to the commutator 1 and radially spaced therefrom. The ring 14 and the commutator 1 are axially displaceable to one another. Furthermore, the ring 14 rotates with respect to commutator 1, or vice-versa, to brush away varnish residue. The ring 14 is attached to a support unit 16 for rotary and axial movement.

The device depicted in FIG. 8 resembles those which have been described with reference to FIGS. 4 and 5. A jet nozzle 17 positioned on the circumference of the commutator 1 and at a distance therefrom emits a stream of fine particles 18 which bombard the wires 5 placed around the hooks 3. The jet nozzle 17 is mounted in a stationary manner, and commutator 1 rotates around its axis to provide relative movement required to abrade all the wires. Alternatively, several jet nozzles 17 can also be provided spaced around the circumference of the commutator 1.

After the varnish insulating layer 6 on the armature coils wires 5, at the points of insertion into the hooks 3, has been at least partially destroyed by thermal and/or mechanical means, the hooks 3 are bent toward the commutator while simultaneously being subjected to ultrasonic action. For this purpose, the sonotrode of an ultrasonic welding device is used as the bending tool. Reference is first made, for the illustration of this operation, to FIGS. 9 and 10.

In FIG. 9, a sonotrode 19 having two differently-shaped projections 20 and 21 are provided for bending back the hooks 3. Immediately upon placing one of the projections 20 or 21 onto a hook 3, the ultrasonic oscillations of the sonotrode 19 are transferred to the hook 3 and as bending action is increasingly effected, the oscillations also are transferred to the armature coil wire 5 lying in the hook 3. Through this means, the residues or remnants of the varnish insulating layer, which has been at least partially destroyed by thermal and/or mechanical means, are removed by the high-frequency oscillations from the surfaces of the armature coil wire 5 and displaced into a wedge-shaped space 22, which is formed during the bending process, between the wire 5, the internal surface of the hook 3 and the surface of the lamella 2. The bending process is essentially completed when the end of hook 3 impacts the surface of the lamella.

During the continued exertion of pressure by the projection 20 or 21 of the sonotrode 19 onto the hook 3, the parts are finally compressed into the final shape depicted in FIG. 9. As is shown in the drawing, the armature coil wire 5, and the hook 3 are deformed by the contact pressure, over a considerable circumferential area to form a reliable electrical contact. The second process step of bending back the hook 3 under ultrasonic action and the third process step of welding the end of the hook with the lamellas of the commutator 2 directly follow one after the other, overlapping in time.

As shown in FIG. 10, in addition to the wedge-shaped space 22', another space 24 is formed between the wire 5, the internal surface of the hook 3 and the surface of the lamellas 2 into which the residues or remnants of the varnish insulating layer are squeezed. This action produces a secure metallic contact between the lamellas and the hook 3 on the one hand, and the armature coils wire 5 on the other.

In the arrangement depicted in FIG. 11, the sonotrode 19, rotatable around its axis, is provided with a cylindrical sonotrode head 25, the circumference 26 of which is adapted to engage with, and roll on the circumferential surface of the commutator 1. Depressions 27, which are matched with the hooks 3 of the commutator 1, are spaced at regular distances on the circumferential surface 26 so that, during the rolling movement, the hooks 3, during execution of the described bending and welding process, are accommodated within the depressions 27.

What is claimed is:

1. A method for producing an electrically-conducting and mechanically solid connection between insulated armature winding wires and wire-engaging hooks on the lamellas of a commutator comprising engaging said insulated winding wires with said hooks, before bending the hooks to engage the commutator, at least partially destroying the insulation on the winding wires in the area of engagement with the hooks, thereby producing insulation residue, bending the hooks to bring the ends of the hooks into contact with the commutator while removing any residue of insulation from the engaging surfaces by ultrasonic oscillations, and ultrasonically welding said hook ends to the lamellas of the commutator.

2. The method of claim 1 in which the insulation residue removed from the winding wires is displaced to a wedge-shaped space formed between the winding wire, the internal surface of the hook and the surface of the commutator.

3. The method of claim 1 in which the insulation on said winding wire is a varnish and said partial destruction step is carried out by thermal or mechanical means and includes relative movement between the commutator and the thermal or mechanical means within the space between the ends of the hooks and the surface of the commutator.

4. The method of claim 1 in which said partial destruction step is carried out by means of an electric heater in contact with the engaged wires.

5. The method of claim 1 in which said partial destruction step is carried out by means of heated gases directed on the engaged wires.

6. The method of claim 1 in which said partial destruction step is carried out by means of a laser beam.

7. The method of claim 1 in which said partial destruction step is carried out by heating the wires inductively in the area of engagement.

8. The method of claim 1 in which said partial destruction step is carried out by mechanically abrading the wires.

9. The method of claim 8 in which said mechanical abrading is effected by bombarding the wires with fine solid particles.

10. The method of claim 1 in which said partial destruction step is carried out by thermal or mechanical means and includes rotating the thermal or mechanical means with respect to the commutator.

* * * * *